(12) United States Patent
Kröhling et al.

(10) Patent No.: US 11,050,607 B2
(45) Date of Patent: Jun. 29, 2021

(54) PROXY WITH A FUNCTION AS A SERVICE (FAAS) SUPPORT

(71) Applicant: Red Hat, Inc., Raleigh, NC (US)

(72) Inventors: Juraci Paixão Kröhling, Munich (DE); Heiko Wolfgang Rupp, Baden-Württemberg (DE)

(73) Assignee: RED HAT, INC., Raleigh, NC (US)

( * ) Notice: Subject to any disclaimer, the term of this patent is extended or adjusted under 35 U.S.C. 154(b) by 189 days.

(21) Appl. No.: 15/629,191

(22) Filed: Jun. 21, 2017

(65) Prior Publication Data

US 2018/0375712 A1 Dec. 27, 2018

(51) Int. Cl.
*H04L 29/06* (2006.01)
*H04L 29/08* (2006.01)

(52) U.S. Cl.
CPC .. *H04L 29/08711* (2013.01); *H04L 29/06578* (2013.01); *H04L 29/06619* (2013.01);
(Continued)

(58) Field of Classification Search
CPC .............. H04L 67/28; H04L 63/0281; H04L 29/06619; H04L 21/4622; H04L 21/485; H04L 21/8173; H04L 67/10; H04L 12/2856; H04L 67/025; H04L 63/0807; H04L 67/2838; H04L 63/0884; H04L 29/08711; H04L 29/06578; H04L 29/08729; G06F 9/547; G06F 21/335; G06F 2209/541; G06F 2209/549; G06F 9/548; G06F 16/972; G06F 21/645; G06F 9/465; G06F 2209/544; G06F 9/449; G06F 9/4488; G06F 9/5005; H04N 21/4622; H04N 21/485; H04N 21/8173
(Continued)

(56) References Cited

U.S. PATENT DOCUMENTS 6,304,894 B1 * 10/2001 Nakayama et al. .......... 709/203
6,321,275 B1 * 11/2001 McQuistan ............ G06F 9/547
                                                719/330
(Continued)

FOREIGN PATENT DOCUMENTS

WO     WO2016192866 A1     12/2016
WO     WO2017025203 A1      2/2017

OTHER PUBLICATIONS

Mike Roberts, A Look at Serverless Architecture, Jun. 20, 2016, DZone, pp. 1-11 (Year: 2016).*
(Continued)

*Primary Examiner* — Backhean Tiv
*Assistant Examiner* — Linh T. Nguyen
(74) *Attorney, Agent, or Firm* — Haynes and Boone, LLP (57) ABSTRACT

An example method for processing a client request includes determining a set of functions to invoke for processing an initial request sent by a client to an application. The set of functions includes a function stored at a server. The method also includes invoking, by a proxy, the function at the server. The server provides the function as a function as a service (FAAS) for invocation by one or more third parties. The method further includes sending, by the proxy, a processed request to the application. The processed request is based on a result of the function. The method also includes receiving, by the proxy, a response to the processed request from the application.

20 Claims, 6 Drawing Sheets

(52) U.S. Cl.
CPC .... *H04L 29/08729* (2013.01); *H04L 63/0227* (2013.01); *H04L 63/0281* (2013.01); *H04L 67/2814* (2013.01); *H04L 67/2838* (2013.01)

(58) Field of Classification Search
USPC ....... 709/203, 202, 219, 217, 227, 228, 223; 719/318, 330
See application file for complete search history.

(56) References Cited

U.S. PATENT DOCUMENTS

| | | | | |
|---|---|---|---|---|
| 7,398,533 | B1* | 7/2008 | Slaughter | 719/328 |
| 7,668,924 | B1* | 2/2010 | Young | H04L 67/1097 709/212 |
| 9,509,782 | B2 | 11/2016 | Lawson et al. | |
| 2002/0032783 | A1* | 3/2002 | Tuatini | H04L 67/16 709/229 |
| 2003/0167358 | A1* | 9/2003 | Marvin | G06F 9/465 719/328 |
| 2005/0138113 | A1* | 6/2005 | Brendle | H04L 29/06 709/203 |
| 2005/0149940 | A1* | 7/2005 | Calinescu | G06F 9/5061 718/104 |
| 2007/0204279 | A1* | 8/2007 | Warshavsky | G06F 9/46 719/330 |
| 2010/0077286 | A1* | 3/2010 | Guagenti | H04L 1/1867 715/205 |
| 2010/0082771 | A1* | 4/2010 | Wood | G06F 15/16 709/219 |
| 2010/0299437 | A1 | 11/2010 | Moore | |
| 2011/0238722 | A1* | 9/2011 | Presley | G06F 9/548 709/201 |
| 2013/0042258 | A1* | 2/2013 | Rector | G06F 8/51 719/328 |
| 2014/0207927 | A1* | 7/2014 | Fichtenholtz | H04L 67/16 709/223 |
| 2014/0243100 | A1* | 8/2014 | Chan | G06F 9/4406 463/42 |
| 2015/0106428 | A1* | 4/2015 | Elias | H04L 29/06 709/203 |
| 2016/0019071 | A1* | 1/2016 | Webb | G06F 9/44 719/331 |
| 2016/0127254 | A1 | 5/2016 | Kumar et al. | |
| 2017/0012941 | A1 | 1/2017 | Subbarayan et al. | |
| 2018/0052723 | A1* | 2/2018 | Yim | G06F 9/548 |
| 2018/0088926 | A1* | 3/2018 | Abrams | H04L 67/34 |
| 2018/0217886 | A1* | 8/2018 | Lahman | G06F 9/548 |
| 2018/0288091 | A1* | 10/2018 | Doron | H04L 63/1458 |
| 2019/0386993 | A1* | 12/2019 | Lu | H04L 9/3263 |

OTHER PUBLICATIONS

"Create Functions and Turn Them into Scalable API Services", StdLib A Standard Library for Microservices © 2017 Polybit Inc., https://stdlib.com/.
Marek Smet, "Serverless Architecture—Aws Lambda", Publ. Mar. 15, 2017, http://www.schibsted.pl/blog/back-end/serverless-architecture-aws-lambda/.
"Microservices Ecosystem Transit Map", https://www.nanoscale.io/ecosystem/.
Mike Roberts, "Serverless Architectures", Publ. Aug. 4, 2016, http://martinfowler.com/articles/serverless.html.

* cited by examiner

PROXY WITH A FUNCTION AS A SERVICE (FAAS) SUPPORT

FIELD OF DISCLOSURE

The present disclosure generally relates to computing devices and more specifically to providing a proxy with a function as a service support.

BACKGROUND

A web server may host one or more web applications. A client may send a request for content to a web application. In some examples, a proxy server sits between the client and web server and mediates interactions between them. If the client sends a request to the web server, the request may be sent to the proxy server, which may retrieve the data requested by the client from the web server. As such, the proxy server may access the web server on behalf of the client. In doing so, the proxy server may enable caching, filtering, and a sense of security for the clients on the network. In response to the request, the web server may send the response to the proxy server, which may repackage the response and forward it to the client.

BRIEF SUMMARY

Methods, systems, and techniques for processing a client request in accordance with one or more aspects of the present disclosure are provided. An example method of processing a client request includes determining a set of functions to invoke for processing an initial request sent by a client to an application. The set of functions includes a function stored at a server. The method also includes invoking, by a proxy, the function at the server. The server provides the function as a FAAS for invocation by one or more third parties. The method further includes sending, by the proxy, a processed request to the application. The processed request is based on a result of the function. The method also includes receiving, by the proxy, a response to the processed request from the application.

An example system for processing a client request includes a proxy server that receives an initial request sent by a client to an application. The system also includes a FAAS provider that determines a function to invoke for processing the initial request and invokes the function. The function is stored at a server that provides the function as a FAAS for invocation by one or more third parties. The proxy sends a processed request to the application and receives a response to the processed request from the application. The processed request is based on a result of the function.

An example machine-readable medium includes a plurality of machine-readable instructions that when executed by one or more processors is adapted to cause the one or more processors to perform a method including: determining a set of functions to invoke for processing an initial request sent by a client to an application, the set of functions including a function stored at a server; invoking, by a proxy, the function at the server, the server providing the function as a function as a service (FAAS) for invocation by one or more third parties; sending, by the proxy, a processed request to the application, the processed request being based on a result of the function; and receiving, by the proxy, a response to the processed request from the application.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A proxy server may "sit" in front of an application and mediate requests to and responses from the application. For example, the proxy server may mediate interactions between a client and a server. In doing so, the proxy server may enable caching, filtering, and a sense of security for the clients on the network. If other proxy servers are present and sit in front of the application, performance may be negatively impacted because each request may flow through multiple proxy servers before arriving at the application. Additionally, the presence of multiple proxy servers may increase the chances of failure.

A solution to the problems that may arise from having multiple proxy servers mediate requests to and/or responses from applications may involve providing a single proxy server that communicates with a function as a service (FAAS) provider. FAAS is a category of cloud computing services that provides a platform allowing users to develop, run, and manage application functionalities without the complexity of building and maintaining the infrastructure typically associated with developing and launching an application. The proxy server may utilize the services of the FAAS provider in order to process requests sent by a client to an application and process responses from the application to the client.

An example method of processing a client request includes determining a set of functions to invoke for processing an initial request sent by a client to an application. The set of functions includes a function stored at a server. The method also includes invoking, by a proxy, the function at the server. The server provides the function as a FAAS for invocation by one or more third parties. The method further includes sending, by the proxy, a processed request to the application. The processed request is based on a result of the function. The method also includes receiving, by the proxy, a response to the processed request from the application.

The present disclosure provides techniques for processing a client request using a proxy that provides FAAS support. Unless specifically stated otherwise, as apparent from the following discussion, it is appreciated that throughout the description, discussions utilizing terms such as "determining," "receiving," "sending," "providing," "storing," "identifying," "retrieving," "invoking," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
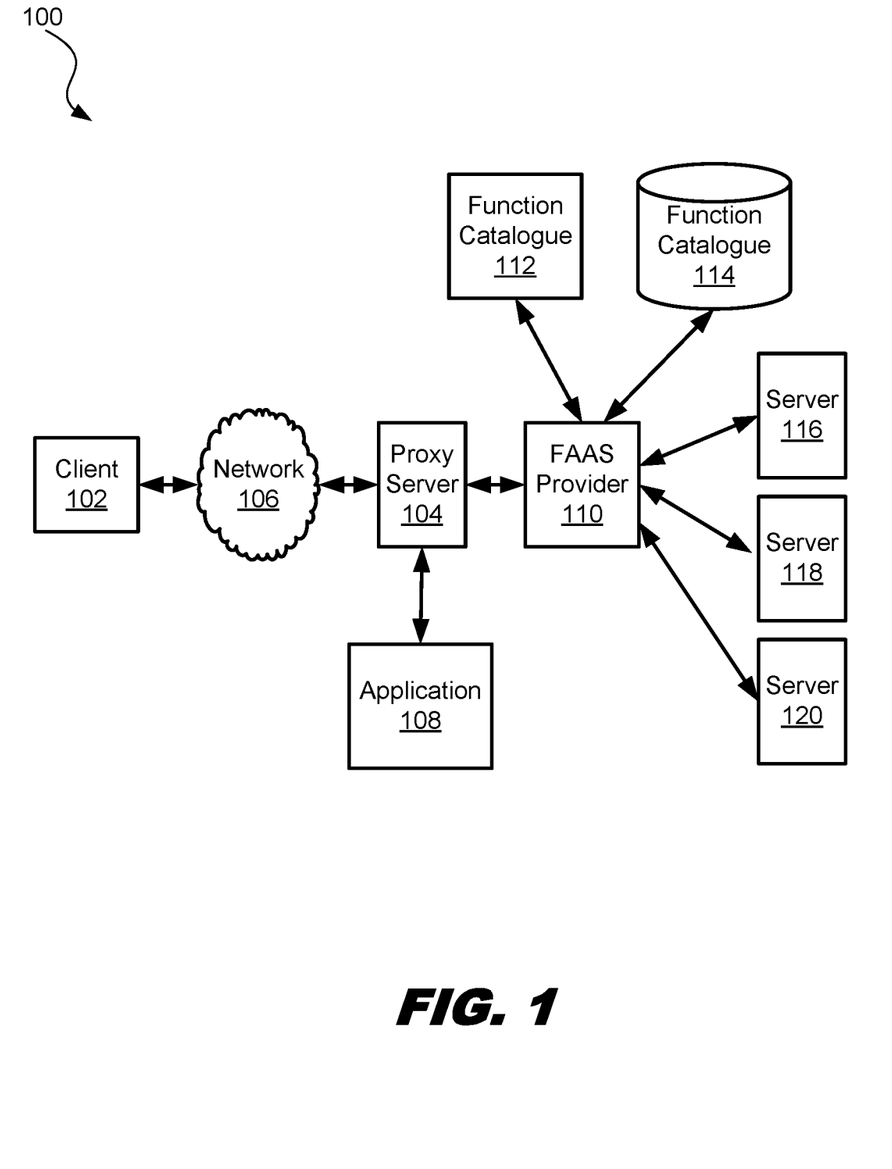
FIG. 1 depicts an example system for processing a client request using a proxy server and function as a service (FAAS), in accordance with one or more aspects of the present disclosure.

FIG. 1 depicts an example system 100 for processing a client request using a proxy server and function as a service (FAAS), in accordance with one or more aspects of the present disclosure. System 100 includes a client 102 and a proxy server 104 coupled to a network 106. Network 106 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi, Hypertext Transfer Protocol (HTTP), HTTP Secure (HTTPS), and various combinations of the foregoing. HTTPS is a combination of the HTTP with the Secure Socket Layer (SSL)/Transport Layer Security (TLS) protocol.

Client 102 may send a request to application 108 for processing. A platform may allow developers to separate an application from the infrastructure and treat the infrastructure like a managed application. The application may be distributed into many "smaller parts" that communicate with each other, which may be compiled together at runtime. In an example, an application is decomposed into "microservices" using one or more containers. A container is a self-contained execution environment and offers software that creates virtual environments mimicking a full virtual machine. A container is an isolated processing space that can exist on top of a virtual machine or on top of actual hardware. In an example, at least a portion of the server-side logic is written by the application developer and is run stateless compute containers that are event-triggered, ephemeral (may only last for one function invocation), and fully managed by a third party.

In another example, the application is a monolithic application. A monolithic model of application architecture may involve building a single integrated application containing the majority of features and functions. The logic for handling a request may run in a single process, allowing the use of basic features to divide the application into classes, functions, and namespaces. The application may be horizontally scaled by running many instances behind a load balancer. Change cycles of a monolithic model are tied together such that a change made to a part of the application may result in the rebuild and deployment of the entire application.

Proxy server 104 may "sit" in front of application 108 and supply services to the application. For example, proxy server 104 may interact with FAAS provider 110, which may be used as an intermediary to invoke functions for processing client requests to the application. In an example, proxy server 104 and FAAS provider 110 are co-located in one application-binary. Proxy server 104 may be transparent to client 102 and application 108. To process a client's request, application 108 may utilize one or more individual functions, actions, or pieces of business logic that are accessible via FAAS provider 110.

Although FAAS provider 110 is illustrated as being separate from proxy server 104, it should be understood that in some examples, FAAS provider 110 is incorporated into proxy server 104. Upon startup, FAAS provider 110 may query function catalogues 112 and 114. A function catalogue may be stored on disk (e.g., a database or text file) or on a server remote from FAAS provider 110 and/or proxy server 104 (e.g., Domain Name System (DNS) server, Representational State Transfer (REST) server, etc.). A function catalogue may register one or more available functions that may be invoked by an entity. Proxy server 104 and/or FAAS provider 110 may verify the available functions, determine which functions to invoke for a request or response, and invoke the applicable function(s). For example, proxy server 104 may verify whether a function is in a particular directory. An administrator may install new functions in a function catalogue.

Proxy server 104 and/or FAAS provider 110 may be able to determine under what conditions the new functions should be invoked. In some examples, proxy server 104 queries one or more function catalogues to cache the available functions. FAAS provider 110 may assemble a list of available functions and initiate connections with servers storing a function included in the list. For example, each of servers 116, 118, and 120 may store one or more functions invocable by FAAS provider 110. Each of servers 116, 118, and 120 may be local to or remote from FAAS provider 110. In some examples, FAAS provider 110 establishes a connection with server 116 upon detecting that a function stored on the server is to be invoked. After the server returns the result of the function to FAAS provider 110, FAAS provider 110 may close the connection. The invocation of functions may be provided "as a service" such that the servers storing the functions are not "always on." In particular, application 108 may run without the provisioning or managing of servers 116, 118, and/or 120. Accordingly, system 100 may significantly reduce operational costs and complexity. Additionally, in some examples, servers 116, 118, and 120 may be incorporated into a single server.

Figure 2:
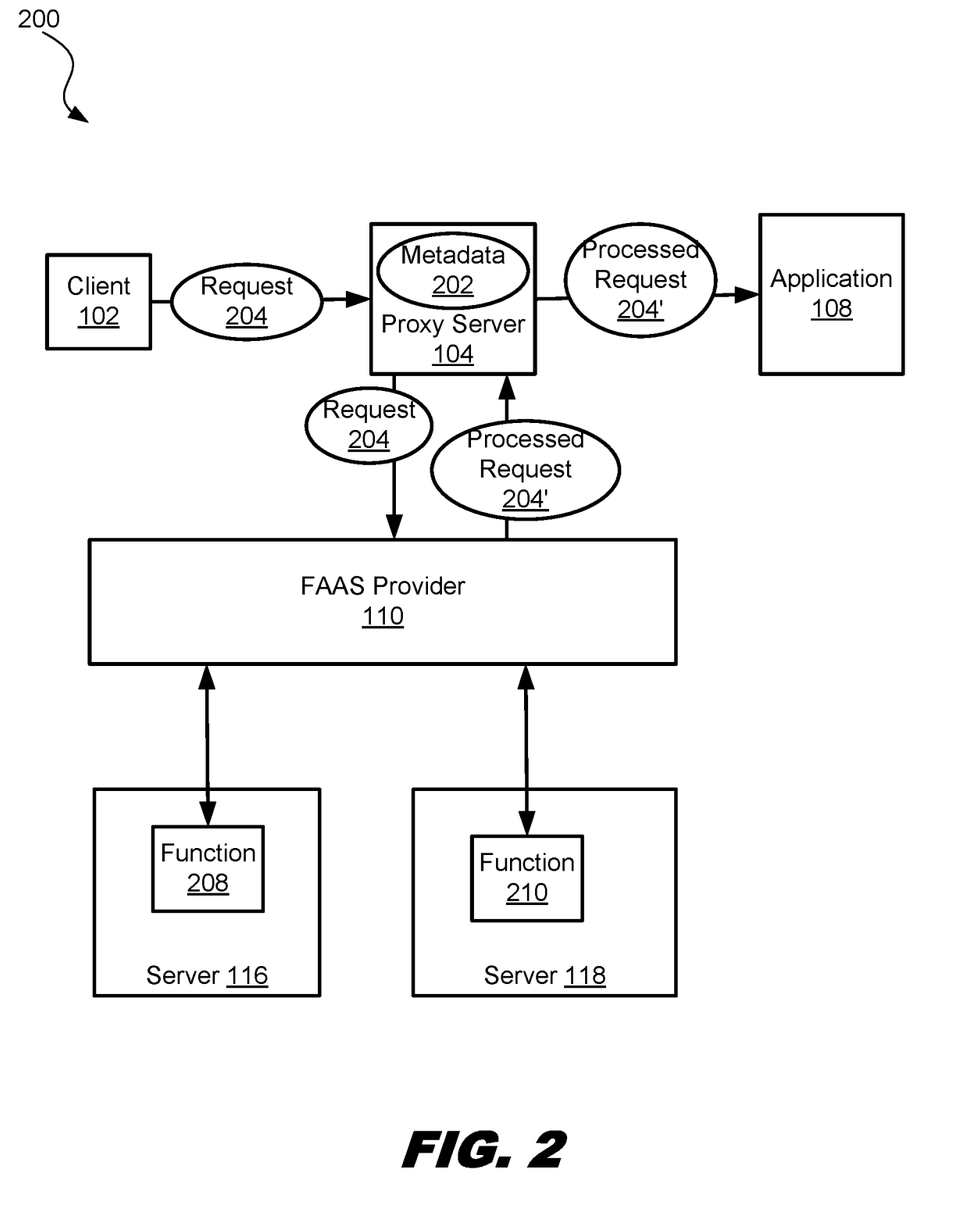
FIG. 2 depicts an example process diagram for processing a client request using a proxy and a FAAS provider for the "request processing phase" in accordance with one or more aspects of the present disclosure.

FIG. 2 depicts an example process diagram 200 for processing a client request using a proxy and a FAAS provider for the "request processing phase" in accordance with one or more aspects of the present disclosure. Client 102 sends a request 204 to application 108. Proxy server 104 "sits" in front of application 108 and obtains request 204. Proxy server 104 may intercept request 204 before it reaches application 108. Proxy server 104 obtains metadata 202 that is specific to proxy server 104 and/or FAAS provider 110 and may pass this metadata to FAAS provider 110, which may pass the appropriate metadata to the functions to be invoked. Metadata 202 may describe a function (e.g., "request processing phase" function, "response processing phase" function, etc.) and indicate whether a request and/or a response should cause the function to be invoked.

Table A provides an example of metadata:

```
{
"name": "add-request-id",
"description": "Add a randomly generated request ID to the incoming request",
"apply-to": {"path":"*"},
"on-request": {"code": "function(request) {request.headers['Request-Id']-guid( )}"
}
```

The metadata in Table A indicates that a request ID should be generated and inserted into an incoming request. Metadata 202 may be stored in, for example, a JavaScript Object Notation (JSON) file, a database, a DNS text record, or other location. Although metadata 202 is illustrated as being located at proxy server 104, it should be understood that metadata 202 may be located at FAAS provider 110 (e.g., on disk at a specific directory on FAAS provider 110).

Proxy server 104 initiates the "request processing phase" by relaying request 204 to FAAS provider 110. During the "request processing phase," FAAS provider 110 may determine, based on the metadata, a set of functions to invoke for processing request 204. After the "request processing phase," FAAS provider 110 may provide proxy server 104 with a processed request that is eventually sent to application 108. In an example, FAAS provider 110 determines that a function 208 stored on server 116 and a function 210 stored on server 118 should be invoked for request 204. Accordingly, FAAS provider 110 may pass request 204 along to servers 116 and 118. Functions and 210 are offered as a "FAAS" by FAAS provider 110.

FAAS provider 110 dynamically manages the allocation of machine resources for one or more applications and offers functions that may be invoked by the applications. FAAS provider 110 abstracts the notion of servers, so FAAS provider 110 may execute the desired functions on the same server, or spread the load through a farm of physical servers. Additionally, each of the functions offered by FAAS provider 110 may be executed in parallel or serial and may add, modify, and/or remove properties from request 204. It should be understood that in other examples, functions 208 and 210 may be stored on the same server.

Figure 3:
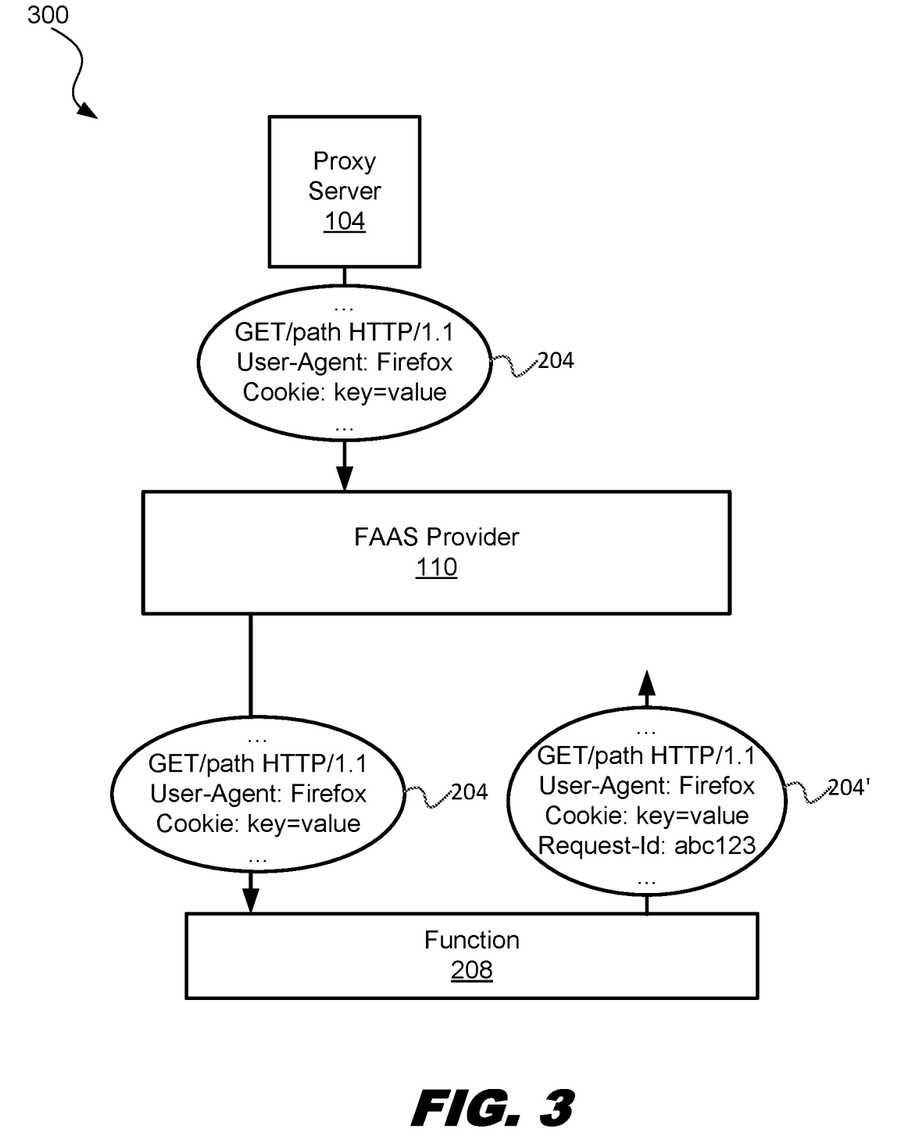
FIG. 3 provides an example of the processing of a request by a function.

FIG. 3 provides an example of the processing of request 204 by a function. In FIG. 3, proxy server 104 sends request 204 to FAAS provider 110, which passes the request to function 208. Function 208 generates a processed request 204' by inserting a header "Request-Id: abc123" into the request 204. Metadata 202 may correspond to function 208. In an example, a function is part of a distributed tracing pipeline that marks a tracing transaction as "starting." Distributed tracing may convey a story of a transaction or workflow as it propagates through a system. For example, the distributed tracing may measure how long a procedure has taken to complete from beginning to end. If application 108 is a distributed application, the use of proxy server 104 and FAAS provider 110 may provide a mechanism for transparently maintaining tracing information. The tracing function inserts a trace identifier (ID) into the request and passes it along to another entity (e.g., FAAS provider 110 or another function).

In another example, a function is a security function. In this example, metadata 202 may specify that for an incoming request to an application having a particular application identifier (ID) (e.g., an ID that identifies application 108), the requesting user should satisfy one or more criteria. For example, a function may check whether client 102 is an administrator of the organization, part of the finance department, an employee of the organization, etc. In another example, a function is an A/B testing function that tests certain behaviors. For example, the A/B testing function may keep track of users' behaviors when an electronic shopping cart is placed on a bottom versus a top of the webpage. In another example, a function is a logging function that logs each incoming request along with other information (e.g., content that is being requested, a timestamp of the request, etc.). In an example, server 116 sends processed request 204' back to FAAS provider 110. In another example, server 116 sends the processed request to another function that further modifies it.

Referring back to FIG. 2, FAAS provider 110 may also send request 204 to function 210, which processes request 204 and sends a processed request back to FAAS provider 110. In another example, function 208 is part of a chained set of functions that serve as a pipeline through which a request may flow. In the pipeline, a result of a first function invocation may serve as an input into a second function, and so on. In this example, function 208 may send processed request 204' along to function 210 for further processing. Function 210 may further process the request, and the processed request eventually is sent back to FAAS provider 110. In an example, function 208 is the security function that authenticates client 102's use of application 108, function 210 is the tracing function, and a third function (not shown) is the logging function. After client 102 has been authenticated, function 208 may pass the request along to function 210, which inserts the trace ID. After the trace ID has been inserted, function 210 may pass the processed request along to the third function to start logging information about the request.

If each of these functions were assembled into a single proxy server "in front" of application 108, a large amount of load would result because the proxy server may be heavy and overwhelmed. Additionally, this would serve as a potential single point of failure. By using FAAS provider 110, each function may potentially fail but not cause the entire processing of requests to fail. Moreover, if a particular function is invoked over a threshold number of times, more servers may be used for processing of a request and invocation of that particular function. Accordingly, the system may scale according to the utilization of a function. Moreover, an advantage of chaining functions together may include saving processing cycles. For example, if the security function sits before the tracing function, it may be unnecessary for the tracing function to perform the same security check performed by the security function. Rather, the tracing function may know that the security function has already checked and confirmed that the request has been authenticated and thus safe for the tracing function to process.

FAAS provider 110 collects the one or more results of the one or more functions invoked for processing request 204. FAAS provider 110 processes these results and generates processed request 204' based on the one or more results. Processed request 204' may include one or more modifications by the one or more invoked functions. FAAS provider 110 transmits the processed request 204' to proxy server 104.

Figure 4:
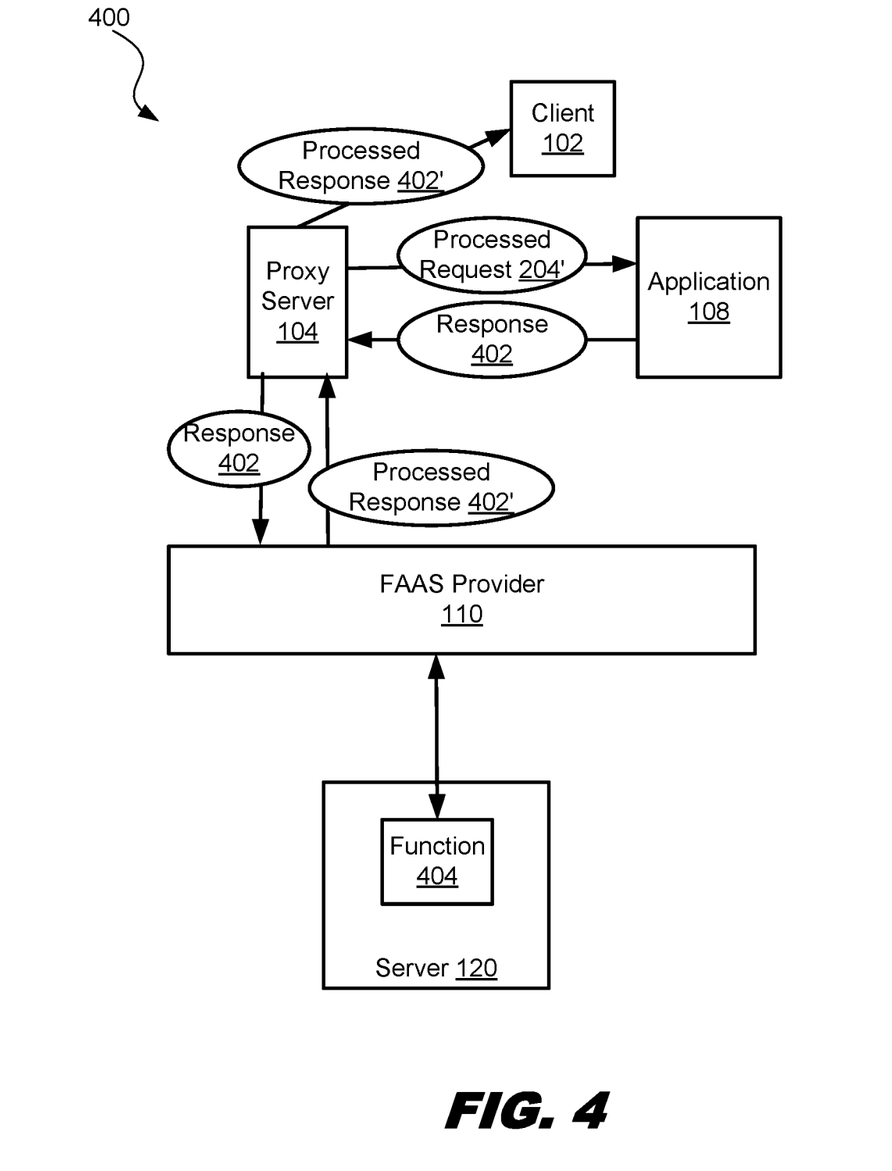
FIG. 4 depicts an example process diagram for processing a response using a proxy and a FAAS provider for the "response processing phase" in accordance with one or more aspects of the present disclosure.

Referring back to FIG. 2, FAAS provider 110 sends processed request 204' to proxy server 104. Proxy server 104 receives processed request 204' and sends it to application 108 for further processing. FIG. 4 depicts an example process diagram 400 for processing a response using a proxy and a FAAS provider for the "response processing phase" in accordance with one or more aspects of the present disclosure. As shown in FIG. 4, application 108 processes processed request 204' and generates a response 402 to the request. Application 108 sends response 402 to client 102. Before response 402 arrives at client 102, proxy server 104 obtains response 402 and initiates the "response processing phase" by relaying response 402 to FAAS provider 110.

During the "response processing phase," FAAS provider 110 may determine a set of functions to invoke for processing response 402. After the "response processing phase," FAAS provider 110 may provide proxy server 104 with a processed response that is eventually sent to client 102 and in response to its initial request 204. In an example, FAAS provider 110 determines that it is unnecessary to perform further processing on response 402. In this example, FAAS provider 110 returns response 402 to proxy server 104, which returns the response 402 to client 102.

In the example illustrated in FIG. 4, function 208 determines that third function 404 stored on server 120 should be invoked for processing response 402. Accordingly, FAAS provider 110 may pass response 402 along to server 120. Function 404 is offered as a "FAAS" by FAAS provider 110. Each of the functions offered by FAAS provider 110 may be executed in parallel or serial and may add, modify, and/or remove properties from response 402. In an example, function 404 applies security checks to response 402 to determine whether client 102 is an attacker that is successfully retrieving confidential information. In this example, a response would not be sent back to client 102. In another example, function 404 marks a tracing transaction as finished. In this example, a "start trace" function (e.g., function 208) may correspond to function 404 and started a tracing transaction, which is later closed by function 404's marking the tracing transaction as finished. In this example, client 102 may receive the processed response without knowledge of the invocation of function 404 on the response. When the trace returns, function 404 may identify the trace ID and calculate how long the process took to complete. FAAS provider 110 collects the one or more results from one or more functions invoked for processing response 402. FAAS provider 110 processes these results and generates processed response 402', which includes the modifications of the one or more functions to response 402.

Figure 5:
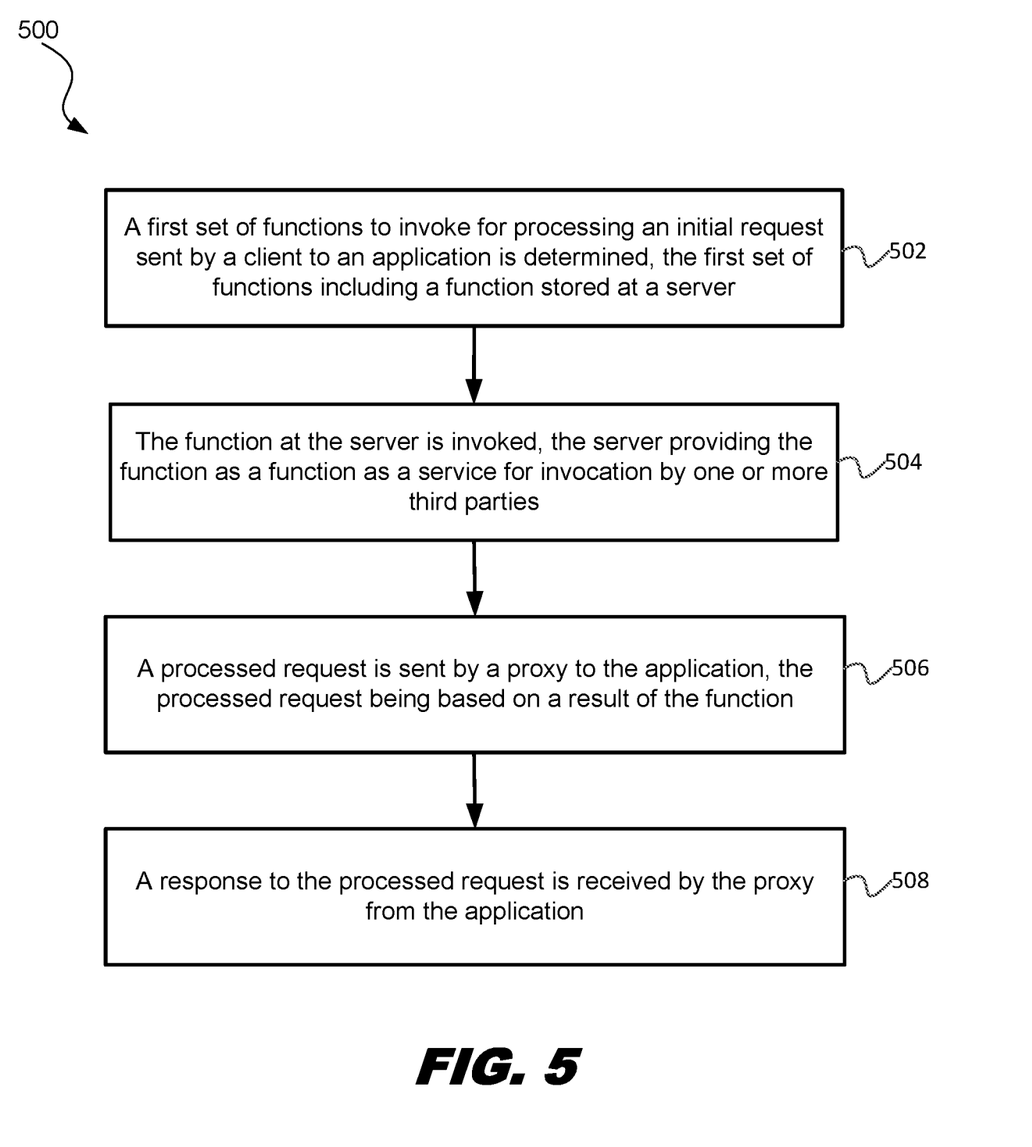
FIG. 5 is a flowchart illustrating an example method for processing a client request using a proxy and a FAAS provider for the "request processing phase" in accordance with one or more aspects of the present disclosure.

FIG. 5 is a flowchart illustrating an example method 500 for distributing secure content to one or more clients in accordance with one or more aspects of the present disclosure. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by the system 100 illustrated in FIG. 1. For example, method 500 may be performed on one or more components of the system 100 (e.g., proxy server 104, FAAS provider 110, servers 116, 118, and 120, etc.). In some examples, the order of the actions described below may also be performed according to alternative orderings. In yet other examples, additional actions may be added and actions that are described may be removed.

In FIG. 5, method 500 includes blocks 502-508. In block 502, a first set of functions to invoke for processing a request sent by a client to an application is determined, the first set of functions including a function stored at a server. In block 504, the function at the server is invoked, the server providing the function as a function as a service for invocation by one or more third parties. In block 506, a processed request is sent by a proxy server to the application, the processed request being based on a result of the function. In block 508, a response to the processed request is received by the proxy server from the application.

Additionally, multiple clients may send multiple requests to one or more applications. Blocks 502-508 may be executed for each of these initial requests. For example, client 102 may send another request to application 108 or a second client may send a request to application 108. Proxy server 104 and FAAS provider 110 may be used for these requests and also for responses from the application in order to mediate between the client and the application.

Figure 6:
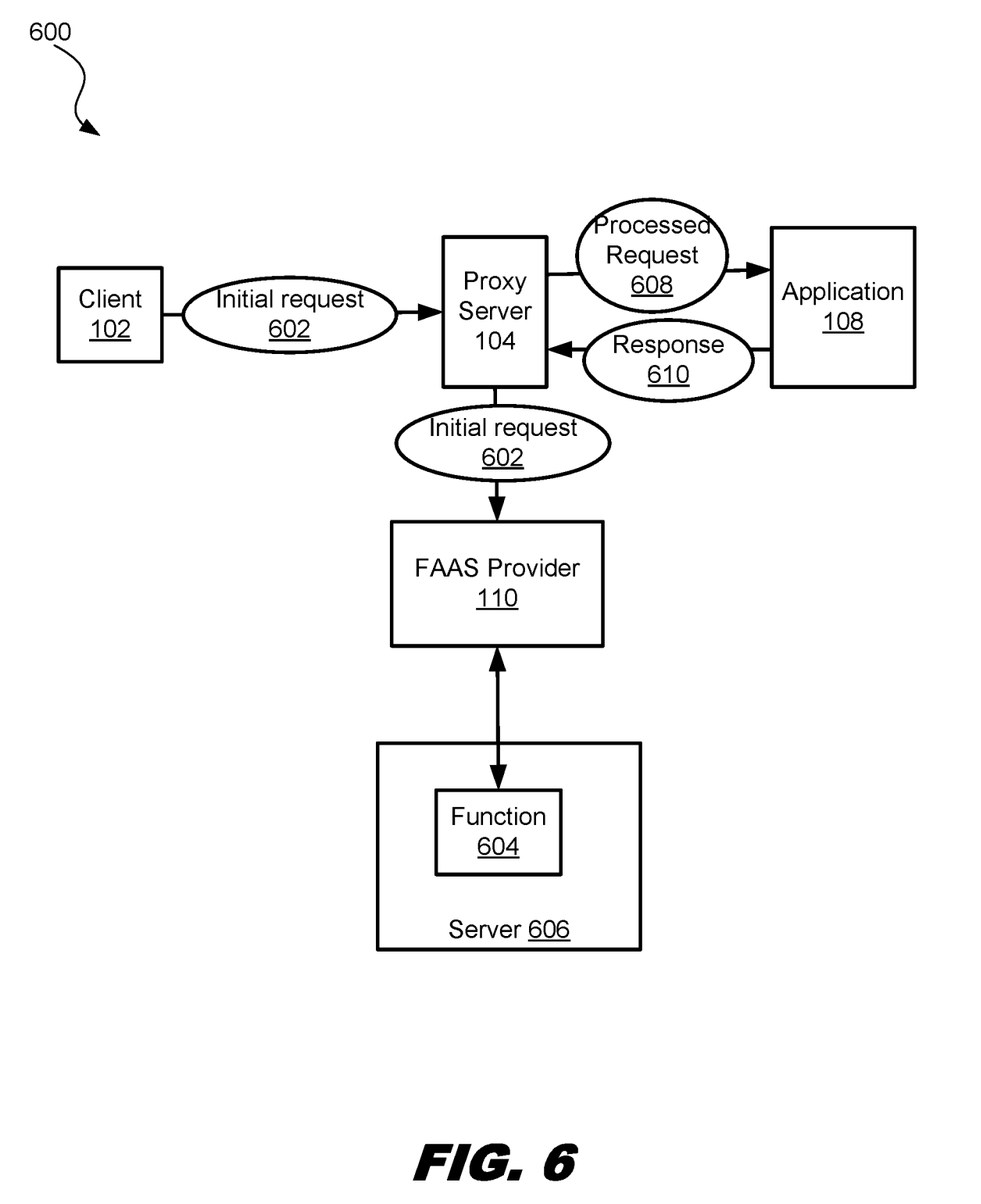
FIG. 6 depicts an example block diagram for processing a client request using a proxy and a FAAS provider for the "request processing phase" in accordance with one or more aspects of the present disclosure.

FIG. 6 depicts an example block diagram 600 for processing a client request using a proxy server and a FAAS provider for the "request processing phase" in accordance with one or more aspects of the present disclosure. In FIG. 6, proxy server 104 receives an initial request 602 sent by a client 102 to application 108. FAAS provider 110 determines a function 604 to invoke for processing the initial request 602 and invokes the function 604. Function 604 is stored at a server 606 that provides the function 604 as a FAAS for invocation by one or more third parties. For example, FAAS provider 110 may invoke function 604 for other requests to and/or responses from an application (e.g., application 108). Proxy server 104 sends a processed request 608 to application 108 and receives a response 610 to the processed request 608 from application 108. Processed request 608 is based on a result of the function 604.

As discussed above and further emphasized here, FIGS. 1-6 are merely examples, which should not unduly limit the scope of the claims. For example, system 100 may include additional devices (e.g., servers, applications, clients, systems, gateways, repositories, and/or processors) than those illustrated in FIG. 1 and/or may include more than one network, devices, and/or systems. Additionally, client 102, proxy server 104, FAAS provider 110, application 108, a function catalogue, and servers 116, 118, and/or 120 may be implemented by hardware, software, firmware and/or any combination thereof.

A computer system is suitable for implementing one or more examples of the present disclosure. In various implementations, the computer system may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The example computer system may include a bus or other communication mechanism for communicating information data, signals, and information between various components of the computer system. Additionally, the computer system includes an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (e.g., a keyboard, keypad, mouse, etc.).

A transceiver or network interface transmits and receives signals between the computer system and other devices via a communications link to a network. In an example, the transmission is wireless, although other transmission mediums and methods may also be suitable. The processor, which may be a micro-controller, digital signal processor (DSP), or other processing component, processes these various signals, such as for display on the computer system or transmission to other devices via a communications link. The processor may also control transmission of information, such as cookies or IP addresses, to other devices.

Components of the computer system also include a system memory component (e.g., RAM), a static storage component (e.g., ROM), and/or a computer readable medium (e.g., disk drive). The computer system performs specific operations by the processor and other components by executing one or more sequences of instructions contained in the system memory component. Logic may be encoded in a computer readable medium, which may refer to any medium that participates in providing instructions to the processor for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 500) to practice the present disclosure may be performed by the computer system. In various other examples, a plurality of the computer systems coupled by a communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or composite actions, and/or separated into sub-steps, sub-blocks, or sub-actions to provide features described herein.

In the foregoing description, numerous details are set forth. It will be apparent, however, to one of ordinary skill in the art having the benefit of this disclosure, that the present disclosure may be practiced without these specific details. In some examples, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the disclosure should be limited only by the following claims, and it is appropriate that the claims be construed broadly and in a manner consistent with the scope of the examples disclosed herein.

What is claimed is:

1. A method of processing a client request, comprising:
determining a plurality of functions to invoke for processing an initial request sent by a client to an application, the plurality of functions including a first function stored at a first server and a second function stored at a second server different from the first server;
invoking, by a proxy, the first function at the first server and the second function at the second server, the first and second servers being remote from the proxy and the client, the first server providing the first function as a function as a service (FAAS) for invocation by one or more third parties, and the second server providing the second function as a FAAS for invocation by one or more third parties, wherein an output of the first function is an input of the second function;
sending, by the proxy, a processed request to the application, the processed request being based on a result of the first function and a result of the second function;
receiving, by the proxy, an initial response to the processed request from the application; invoking, by the proxy, a third function stored at a third server for processing the initial response, the third server being different from the first and second servers and being remote from the proxy and the client; and sending, by the proxy, a processed response to the client, the processed response being responsive to the initial request and being based on a result of the third function the processed response including at least one modification made by at least one function of the plurality of functions to the initial request.

2. The method of claim 1, further comprising: receiving, by the proxy, the processed request.

3. The method of claim 1, further comprising:
sending a query for functions to one or more function catalogues that store one or more functions;
receiving one or more functions responsive to the one or more queries; and storing the one or more functions, wherein storing the one or more functions includes storing the first function at the first server and the second function at the second server.

4. The method of claim 1, comprising:
obtaining metadata associated with one or more functions, wherein determining the plurality of functions includes determining, based on the metadata, the plurality of functions.

5. The method of claim 1, comprising;
generating the processed request based on the first result and the second result.

6. The method of claim 1, wherein the first server is remote from the second server.

7. The method of claim 1, comprising:
determining that the first function has been invoked over a threshold number of times; and
launching a fourth server that stores the first function for providing the first function as a FAAS for invocation by one or more third parties in response to a determination that the first function has been invoked over the threshold number of times.

8. A system for processing a client request, comprising:
a proxy server that receives an initial request sent by a client to an application, sends a processed request to the application, receives an initial response to the processed request from the application, and sends a processed response responsive to the initial request to the client; and
a FAAS provider that determines a first function to invoke for processing the initial request and invokes the first function, wherein the first function is stored at a first server that provides the first function as a FAAS for invocation by one or more third parties, and the first server is remote from the proxy server and the client, wherein the FAAS provider receives the processed request from a second function stored at a second server, wherein an output of the first function is an input of the second function, wherein the processed request is based on a result of the first function and a result of the second function, wherein the FAAS provider invokes a third function stored at a third server for processing the initial response, wherein the third server is remote from the proxy server and the client, and the processed response is based on a result of the third function, the processed response including at least one modification made by at least one of the first function, the second function, or the third function to the initial response.

9. The system of claim 8, wherein the application is a monolithic application.

10. The system of claim 8, wherein the proxy and the FAAS provider are co-located in one application-binary.

11. The system of claim 8, wherein the application is decomposed into microservices using one or more containers.

12. The system of claim 8, wherein the FAAS provider determines to invoke the second function for processing the initial request and invokes the second function, wherein the second server provides the second function as a FAAS for invocation by one or more third parties, and the second server is remote from the proxy server.

13. The system of claim 8, wherein the first server is different from the second server.

14. The system of claim 8, wherein the FAAS provider generates the processed request, and the proxy server receives the processed request from the FAAS provider.

15. The system of claim 8, wherein the proxy server sends the initial response to the FAAS provider, and the FAAS provider determines whether to invoke one or more functions for processing the initial response.

16. The system of claim 8, wherein the FAAS provider generates the processed response based on a result of the third function.

17. The system of claim 16, wherein the proxy server receives the processed response from the FAAS provider.

18. The system of claim 8, wherein the first server is different from the second server, and the first server is remote from the second server.

19. The system of claim 8, wherein the first server is the same as the second server.

20. A non-transitory machine-readable medium comprising a plurality of machine-readable instructions that when executed by one or more processors is adapted to cause the one or more processors to perform a method comprising:
determining a plurality of functions to invoke for processing an initial request sent by a client to an application, the plurality of functions including a first function stored at a first server and a second function stored at a second server different from the first server;
invoking, by a proxy, the first function at the first server and the second function at the second server, the first and second servers being remote from the proxy and the client, the first server providing the first function as a function as a service (FAAS) for invocation by one or more third parties, and the second server providing the second function as a FAAS for invocation by one or more third parties, wherein an output of the first function is an input of the second function;
sending, by the proxy, a processed request to the application, the processed request being based on a result of the first function and a result of the second function;
receiving, by the proxy, an initial response to the processed request from the application; invoking, by the proxy, a third function stored at a third server for processing the initial response, the third server being different from the first and second servers and being remote from the proxy and the client; and
sending, by the proxy, a processed response to the client, the processed response being responsive to the initial request and being based on a result of the third function, the processed response including at least one modification made by at least one function of the plurality of functions to the initial request.

* * * * *